US010954813B2

(12) United States Patent
Wuestenberg

(10) Patent No.: US 10,954,813 B2
(45) Date of Patent: Mar. 23, 2021

(54) PLANETARY GEARBOX SYSTEM AND METHOD FOR OPERATING A PLANETARY GEARBOX SYSTEM

(71) Applicant: Rolls-Royce Deutschland Ltd & Co KG, Blankenfelde-Mahlow (DE)

(72) Inventor: Hannes Wuestenberg, Berlin (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 11 days.

(21) Appl. No.: 16/050,526

(22) Filed: Jul. 31, 2018

(65) Prior Publication Data

US 2019/0055852 A1 Feb. 21, 2019

(30) Foreign Application Priority Data

Aug. 18, 2017 (DE) .................... 10 2017 214 464.5

(51) Int. Cl.
*F01D 21/14* (2006.01)
*F16H 35/10* (2006.01)
*F16H 57/10* (2006.01)
*F16D 9/00* (2006.01)
*F16D 13/42* (2006.01)
(Continued)

(52) U.S. Cl.
CPC ................ *F01D 21/14* (2013.01); *F02C 7/36* (2013.01); *F16D 9/00* (2013.01); *F16D 13/42* (2013.01); *F16D 13/48* (2013.01); *F16H 1/28* (2013.01); *F16H 35/10* (2013.01); *F16H 57/10* (2013.01); *F05D 2220/327* (2013.01); *F05D 2260/40311* (2013.01); *F05D 2270/09* (2013.01); *F16H 2035/103* (2013.01)

(58) Field of Classification Search
CPC .. F02K 9/38; F02C 3/107; F02C 3/113; F02C 7/36; F02C 3/36; F01D 21/00; F01D 21/14; F01D 21/02; F05D 2260/40311; F05D 2270/09; F05D 2220/327; F05D 2270/021; F16H 1/28
USPC ............................................ 60/779; 411/390
See application file for complete search history.

(56) References Cited

U.S. PATENT DOCUMENTS 2,151,724 A 3/1939 Wengel et al.
3,997,042 A 12/1976 Langham
(Continued)

FOREIGN PATENT DOCUMENTS

DE 2745131 A1 4/1979
DE 102008062088 A1 6/2010
(Continued)

OTHER PUBLICATIONS

German Search Report dated Apr. 17, 2018 from counterpart German App No. 102017214464.5.
(Continued)

*Primary Examiner* — Jeffrey A Shapiro
(74) *Attorney, Agent, or Firm* — Shuttleworth & Ingersoll, PLC; Timothy Klima

(57) ABSTRACT

A planetary gearbox system with a ring gear, a sun gear, a carrier and planetary gears as parts in a geared aircraft turbofan engine, with one static part of the parts being in rest under nominal operation and with a kinematic switch device for decoupling the static part to become a rotatable part or with a kinematic switch device for coupling the rotatable part to become a static part. The invention also relates to a method for operating a planetary gearbox system.

20 Claims, 8 Drawing Sheets

101 14 1B 107 108 1C 104 103 102 1A 106

(51) Int. Cl.

| | |
|---|---|
| ***F16D 13/48*** | (2006.01) |
| ***F02C 7/36*** | (2006.01) |
| ***F16H 1/28*** | (2006.01) |

(56) References Cited

U.S. PATENT DOCUMENTS

| | | | | |
|---|---|---|---|---|
| 4,214,440 | A | 7/1980 | Ruecker et al. | |
| 4,253,557 | A | 3/1981 | Bunger | |
| 5,533,825 | A * | 7/1996 | Stone | F01D 5/026 403/359.6 |
| 6,212,889 | B1 * | 4/2001 | Martin | F15B 15/068 60/602 |
| 2002/0069637 | A1 * | 6/2002 | Becquerelle | F01D 15/12 60/226.1 |
| 2004/0156669 | A1 * | 8/2004 | Lejeune | F01D 21/045 403/2 |
| 2005/0220384 | A1 * | 10/2005 | Plona | F01D 21/045 384/624 |
| 2008/0098717 | A1 * | 5/2008 | Orlando | F01D 1/24 60/226.1 |
| 2008/0120839 | A1 * | 5/2008 | Schilling | F02C 3/107 29/888.02 |
| 2010/0162684 | A1 * | 7/2010 | Baker | F02K 1/15 60/226.3 |
| 2014/0064915 | A1 * | 3/2014 | Masson | F02C 3/113 415/1 |
| 2014/0271135 | A1 * | 9/2014 | Sheridan | F02C 7/36 415/122.1 |
| 2014/0306064 | A1 * | 10/2014 | Palmer | B64G 1/402 244/171.1 |
| 2015/0337762 | A1 | 11/2015 | Penda et al. | |
| 2016/0130975 | A1 * | 5/2016 | Chilton | F01D 21/045 415/9 |
| 2016/0160875 | A1 * | 6/2016 | Schwarz | F04D 27/0246 415/124.1 |
| 2016/0273448 | A1 * | 9/2016 | Duprez | F02K 3/115 |
| 2016/0298751 | A1 * | 10/2016 | McCune | B22F 3/1055 |
| 2017/0002869 | A1 * | 1/2017 | Lee | F02C 7/36 |
| 2017/0081973 | A1 * | 3/2017 | Swift | F01D 5/02 |
| 2017/0082065 | A1 * | 3/2017 | Swift | F02K 3/06 |
| 2017/0175753 | A1 * | 6/2017 | Tan-Kim | F04D 29/325 |
| 2017/0175874 | A1 * | 6/2017 | Schwarz | F16H 57/0435 |
| 2018/0073384 | A1 * | 3/2018 | Bordoni | F01D 15/12 |
| 2018/0363665 | A1 * | 12/2018 | Sheridan | F16H 1/28 |
| 2019/0055999 | A1 * | 2/2019 | Wuestenberg | F01D 21/14 |

FOREIGN PATENT DOCUMENTS

| | | | |
|---|---|---|---|
| EP | 2998557 | A1 | 3/2016 |
| EP | 3121469 | A1 | 1/2017 |
| EP | 3296524 | A1 | 3/2018 |
| WO | WO2016151236 | A1 | 9/2016 |

OTHER PUBLICATIONS

European Search Report dated Jan. 15, 2019 for counterpart European Patent Application No. 18187530.3.

European Search Report dated Apr. 9, 2018 from related European Patent Application No. 17186922.5 [20560-1037].

* cited by examiner

PLANETARY GEARBOX SYSTEM AND METHOD FOR OPERATING A PLANETARY GEARBOX SYSTEM

This application claims priority to German Patent Application DE102017214464.5 filed Aug. 18, 2017, the entirety of which is incorporated by reference herein.

The invention relates to a planetary gearbox system with features as disclosed herein and a method for operating a planetary gearbox system with the features as disclosed herein.

Geared turbofan aircraft engines sometimes require some means to mitigate damages that might occur after a failure. A failure might involve the rotation prevention of at least one part of the drive train. Such a failure might be e.g. a shaft breaking, a rotor-casing contact or a bearing seizure. This becomes even more important for high bypass aircraft engines, in which the drag of a locked fan would be considerable. In other cases the deliberate disengagement of engine parts might be required. Once disengaged, it might be required to reengage, if the operational situation is changed back.

Therefore, gas turbo engines, in particular geared aircraft turbofan engines with an improved disengagement or also engagement capability to flexibly operate the gearbox system in a geared turbofan aircraft engine are required.

This is addressed by a planetary gearbox system in a geared aircraft turbofan engine with features as disclosed herein.

The planetary gearbox system comprises a ring gear, a sun gear, a carrier and planetary gears as parts in a generally known way. In a planetary gearbox generally one of the ring gear, the sun gear or carrier is fixed, with the two other parts moving. That means that in the planetary gearbox system one static part of the parts is being in rest under nominal operation conditions.

The planetary gearbox system further comprises a kinematic switch device for decoupling the static part to become a rotatable part or with a kinematic switch device for coupling the rotatable part to become a static part.

Planetary gearboxes (e.g. with a fixed ring gear or a fixed carrier (star arrangement)) are in some sense differential gearboxes with one part held at rest.

Therefore, by decoupling the static part to become movable, the planetary gearbox system is changed into a differential gearbox, having one more degree of freedom. If a rotatable part is coupled to become a static part the differential gearbox is converted into a planetary gearbox, i.e. the coupling removes a degree of freedom.

The deliberate generation of a gearbox with one more degree of freedom is e.g. helpful if in the geared aircraft engine a fan connected to the turbine through the planetary gearbox has to be operated under windmilling conditions, e.g. under some failure condition. By freeing up the static part, the fan freely rotate. If the windmilling condition is no longer required, the rotatable part can be switched back into a static part.

In one embodiment, the static part which is decoupable or the rotatable part which is coupleable is the ring gear of an epicyclic planetary gearbox system or the carrier of a star-design planetary gearbox system.

In one embodiment the kinematic switch device for decoupling the static part into a rotatable part comprises a mechanical fuse. If the mechanical fuse (e.g. a deliberate thinning of a cross-section of a part) breaks under e.g. a too high torque load, the static part becomes disengaged and the static part is freed. In this context the breaking of a mechanical fuse can be considered as irreversible.

In a further embodiment the kinematic switch device for decoupling the static part or coupling the rotatable part comprises a clutch device. A clutch device can be reengaged after it had be disengaged, so it can be considered providing a reversible connection or a reversible mechanical fuse.

In one embodiment the decoupling of the static part is triggered by a predetermined kinematic condition, in particular in windmilling or an abnormal kinematic condition in the geared aircraft turbofan engine. This can e.g. be torque acting on one of the parts of the gearbox system exceeding a threshold value or the direction of the torque acting on one the parts changing its direction.

In a different embodiment the decoupling or coupling of the static part is effected by the kinematic switch device operating an actuator, in particular an oil driven actuator. In this case the decoupling or coupling are effected by some external means and not some operating conditions such as the torque. In principle it is possible that the embodiments for the effectors of the coupling and decoupling can be combined. The decoupling can e.g. be triggered by an excessive torque, the coupling can then be effected by an external actuator.

Since in one embodiment, a static part is decoupled to become a rotatable part, additional power is generateable by the decoupled part under rotation, in particular for electric motor and/or a pump. A windmilling fan can e.g. generate enough electricity to support a pump of hydraulic fluid or generate electricity.

The kinematic switch device comprises two connecting means and means to automatically trigger a position change of one of the connecting parts relative to the respective other connecting part and/or relative to an engine part from the first position into a second position. This position change can be e.g. a disengagement or a reengagement of the connecting parts. This then leads to the decoupling or coupling of the parts in the gearbox system.

The position change takes e.g. place in dependence of a torque effective on the connecting parts and/or the engine part, in particular through the transmission via a shaft, in particular a non-nominal torque or change in the direction of the torque.

In one embodiment, the means to automatically trigger the position change in the in the kinematic switch device comprise a helical spline connection between the connection parts, an explosive bolt device, an automatic clutch device and/or a hydraulic means for changing the position of the connecting parts depending on the torque effective on the connecting parts and/or the engine part, in particular through the transmission via the shaft, in particular a non-nominal torque or a reversal in the direction of the torque. All the means can have different torque transmission characteristics depending on the torque input (i.e. the absolute value as well as the direction of the torque). In a further embodiment the torque transmission characteristics of the helical spline connection is asymmetric relative to the torque applied to the helical spline connection and/or the automatic clutch comprises a means for balancing different axial loads on a shaft.

The position change can also involve other parts of the gas turbo engine, allowing a more complex coupling or decoupling. In the first position of one embodiment the connecting parts are mechanically engaged with each other and/or with the engine part, so that torque is transmittable between the connecting parts and in the second position the connecting parts are mechanically disengaged with each other and/or the engine part, enabling a torque-free relative movement between the connecting parts and the engine part. The connecting parts can e.g. form a clutch-like device clamping a static engine part.

In one further embodiment, the first connecting part is coupled to the ring gear mount of the gearbox, the first and/or second connecting part are rigidly connected to the ring gear mount of the gearbox, the first connecting part is in one piece with the ring gear mount of the gearbox or to a support structure of the engine, such as a casing.

The first and/or second connecting part can in one embodiment be coupled to static part of the gearbox.

In particular—but not exclusively—the kinematic switch device can be e.g. used to release the ring gear mount decoupling a driven part, in particular a propulsive fan in the case of a disruptive event (e.g. gearbox seizure).

In one embodiment, an engine part is positioned in the first position fixedly relative to the two connecting parts, in particular form-locked and/or friction-locked with the connecting parts and in the second position at least one of the connecting parts is movable relative to the engine part.

This can e.g. be achieved with an embodiment with a clutch device with the first and second connecting parts comprising contact interfaces to the engine part, the contact interfaces being parallel to each other or angled to each other.

Furthermore, in another embodiment, the engine part comprises a ring like structure which is positioned in the first position between the two connecting parts also comprising ring like structures. Together, the ring like structures form a three plate flange.

Another embodiment further comprises a clamping preloading device to apply a predetermined torque on the kinematic switch device, in particular pressing at least one of the connecting parts against the (e.g. static) engine part with a preload force. A further embodiment of the kinematic switch device comprises an axial retention device. The axial retention device keeps e.g. the helical spline connected at all time. That e.g. can be realized with a stop between two static parts.

To improve the torque transmission in one embodiment the connection between the at least one connection part and the engine part comprises a high friction coating on at least one surface of the interface.

In a further embodiment the connection between the clamping preloading means and engine part and/or the connection between the axial retention device and the connecting part comprises a low friction coating on at least one surface.

In one embodiment the planetary gearbox is coupled to a propulsive fan of a geared aircraft turbofan engine, the propulsive fan being configured to drive an electrical generator in windmilling operation conditions in particular via the gearbox and the ring gear mount. If the propulsive fan is not actively driven by the primary power source such as the turbine, the fan should at least freely rotate (windmilling) because otherwise the engine has a large aerodynamic drag. Alternatively or in addition the propulsive fan can being configured to be driven by external power source (e.g. an electrical motor, e.g. driven by the ring gear mount which lead to the powering of the propulsive fan) when decoupled through the mechanical clutch device from its primary power source. By actively driving the propulsive fan, if the primary power source is not available (e.g. due to a failure) or is temporarily not needed (e.g. in a descent phase of a flight without applied thrust), the aerodynamic drag can be further reduced.

The issue is also addressed by a method with features as disclosed herein.

Here one static part of the parts of the planetary gearbox is being held in rest under nominal operation and the static part is decoupled with a kinematic switch device to become a rotatable part or the rotatable part is coupled with the kinematic switch device to become a static part Embodiments of the invention are shown in the figures, where FIG. 1 shows a schematic drawing of a geared aircraft turbofan engine according to the prior art;

Figure 1:
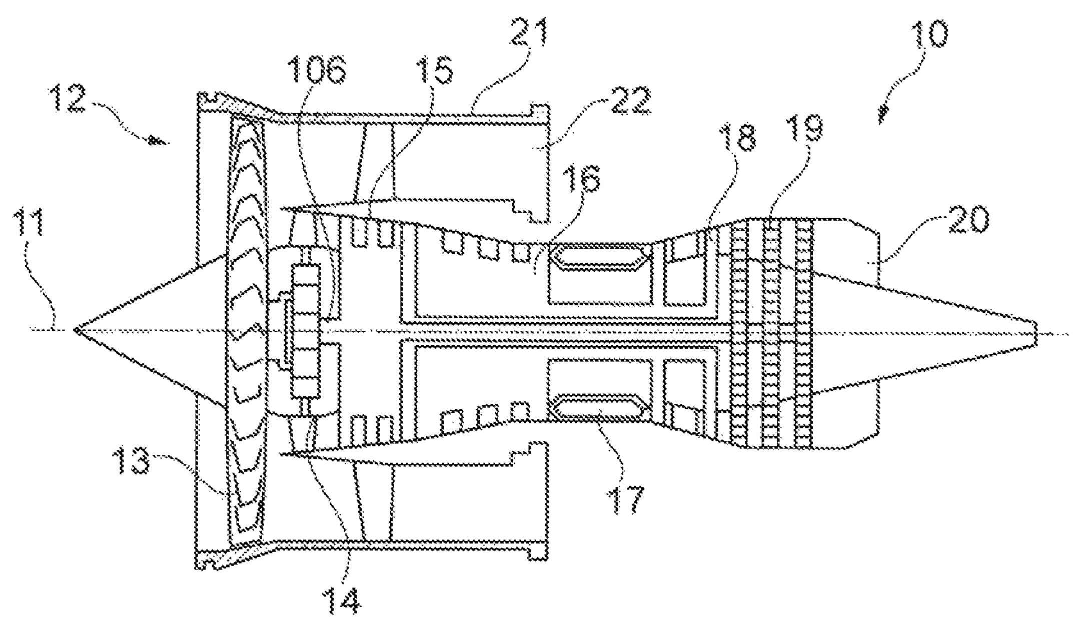

With reference to FIG. 1, a geared turbo fan engine is generally indicated at 10, having a principal and rotational axis 11. The engine 10 comprises, in axial flow series, an air intake 32, a propulsive fan 13 (could be more than one stage), a gearbox 14, an intermediate pressure compressor 15, a high-pressure compressor 16, a combustion equipment 17, a high-pressure turbine 18, an intermediate-pressure turbine 19 and an exhaust nozzle 20. A fan casing 21 generally surrounds the engine 10 and defines the intake 32.

The geared turbofan engine 10 works in the conventional manner so that air entering the intake 32 is accelerated by the propulsive fan 13 to produce two air flows: a first air flow into the intermediate pressure compressor 15 and a second air flow which passes through a bypass duct 22 to provide the main propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture is combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft also drives the propulsive fan 13 via the gearbox 14. The gearbox system 14 comprises a reduction gearbox in that it gears down the rate of rotation of the propulsive fan 13 by comparison with the intermediate pressure compressor 15 and intermediate pressure turbine 19.

The gearbox system 14 in the embodiment shown is an epicyclic planetary gearbox system 14 having a static ring gear 109, rotating and orbiting planet gears 103 supported by a planet carrier 104 and a rotating sun gear 102. In an alternative embodiment, the gearbox 14 has star arrangement, so that the ring gear can be disconnected from the propulsive fan or the carrier from a structure.

The embodiment shown in FIG. 1 has a specific shaft arrangement which is understood not to be limiting. The embodiments described in the following can also work with a 2- or 3-shaft arrangement.

As shown in FIG. 1, geared turbofan engines 10 are known in the art. With increasing power ratings and/or increasing diameters of the propulsive fans 13, the loads on the geared turbofan engine 10 are increasing. Therefore, it seems advisable to introduce flexible measures to operate rotational parts and e.g. counteract potential failure modes or extreme events such as e.g. a fan blade off, a core blade off, a bird strike, a mainline bearing seizure or a gearbox system 14 seizure.

For this purpose the planetary gearbox system 14 comprises kinematic switch device 1 for decoupling a static part of the gearbox system 14 to become a rotatable part or a kinematic switch device 1 for coupling the rotatable part of the gearbox system 14 to become a static part. Different design embodiments using e.g. helical splines and clutch mechanisms will be described in the FIGS. 4 to 8. In general kinematic switch device 1 can e.g. comprise two connecting means 31, 32 (e.g. with helical splines) and means 40 to automatically trigger a position change in least of one of the two connecting parts 31, 32 relative to the respective other connecting part 32, 31 and/or relative to an engine part 41 from a first position into a second position in dependence of a torque T effective on at least one of the two connecting parts 31, 32 and/or the engine part 41, in particular through the transmission via a shaft 106, 108, in particular a non-nominal torque T or a reversal in the direction of the torque T'.

Figure 2:
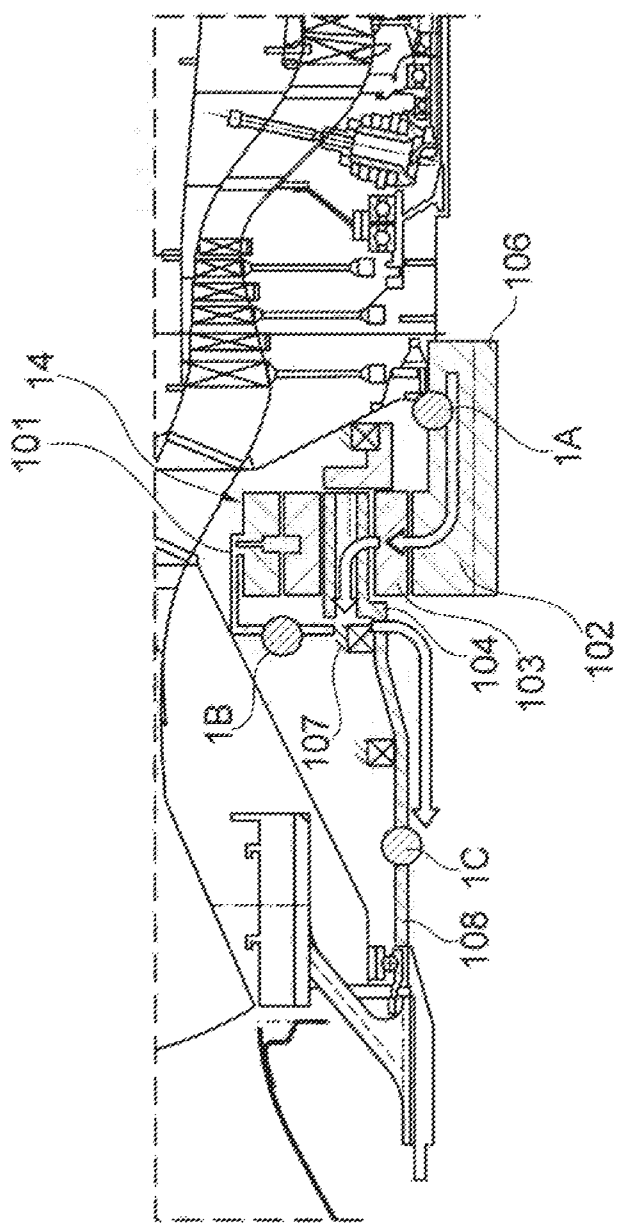
FIG. 2 shows a schematic drawing of the frontal portion of a turbofan engine with a planetary gearbox system (epicyclic planetary arrangement) with different location of kinematic switch devices.

In FIG. 2 first some design context for the placement of the kinematic switch device 1 is given. The view of FIG. 1 is a cross-section through the front of a geared turbofan engine 10 (see e.g. FIG. 1). Here, the gearbox 14 is having an epicyclic planetary arrangement.

The turbine (not shown in FIG. 2) is driving the sun gear 102 of the gearbox 14. The torque is transmitted via the planetary gears 103 to the carrier 104 providing the output torque of the gearbox system 14 (indicated by the arrow). The ring gear mount 101 and the ring gear 109 are static relative to the other parts of the gearbox system 14 under nominal conditions.

In the following, three possible locations 1A, 1B, 1C for a kinematic switch device 1 are discussed.

The first location 1A of a kinematic switch device 1 is in the driving shaft 106 of the sun gear 102.

This means that e.g. the connecting parts 31, 32 are part of the driving shaft. The connecting parts 31, 32 (e.g. like the one shown in FIG. 4A, 4B) can change their relative positions to each other as triggered by a change in the torque direction.

An alternative or additional second location 1B is between the static ring gear mount 101 and a fixed part 107 of the air craft engine 10.

A further alternative or additional third location 10 is in an output shaft 108 of the gearbox system 14.

In each case, two connecting parts 31, 32 are under nominal conditions at rest—static—relative to each other. The connecting parts 31, 32 can disengage under non-nominal conditions. But it also possible that after some time in the disengagement position, a reengagement of the connection parts 31, 32 takes place. With the position change of the connection parts 31, 32 the static part 109 of the epicyclic planetary gearbox system 14 can be decoupled and coupled.

Figure 3:
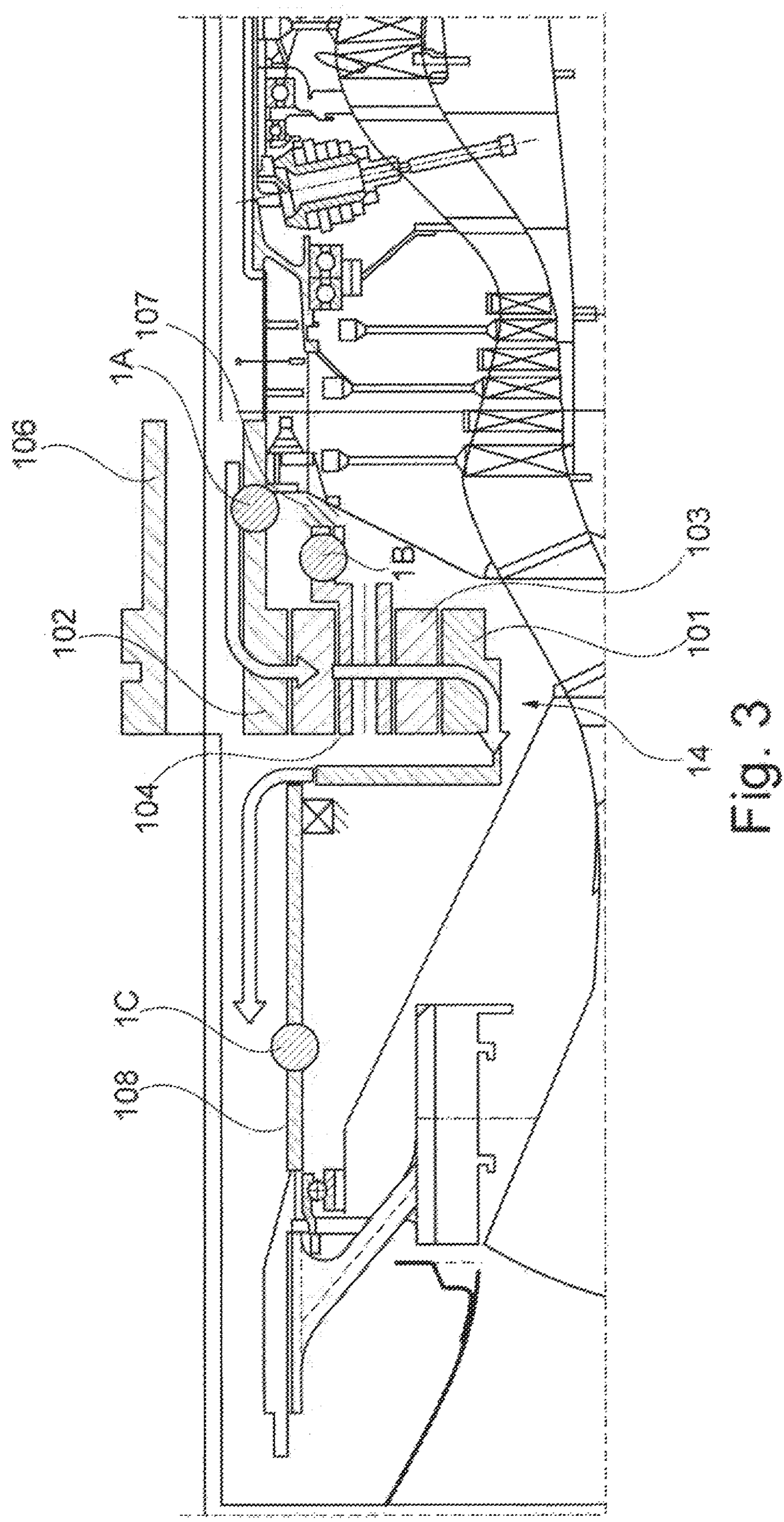
FIG. 3 shows a schematic drawing of the frontal portion of a turbofan engine with a planetary gearbox system (star arrangement) with different location of kinematic switch devices.

In FIG. 3 a similar embodiment to the one in FIG. 2 is described. The main difference is that the gearbox 14 comprises a star arrangement.

The sun gear 102 is driven, driving the planet gears 103 with a fixed carrier 104. The output torque is transmitted via the ring gear 109 and the ring gear mount 101 to the output shaft 108.

The first location 1A of a kinematic switch device 1 in this arrangement is in the driving shaft 106 of the sun gear 102. This means that e.g. the connecting parts 31, 32 are part of the driving shaft. The connecting parts 31, 32 (e.g. like the one shown in FIG. 4A, 4B) can change their relative positions to each other as triggered by a change in the torque direction.

An alternative or additional second location 1B is between the static carrier 104 and a fixed part 107 of the air craft engine 10.

A further alternative or additional third location 10 is in an output shaft 108 of the gearbox system 14.

In each case, two connecting parts 31, 32 are under nominal conditions at rest—static—relative to each other. The connecting parts 31, 32 can disengage under non-nominal conditions. But it is also possible that after some time in the disengagement position, a reengagement of the connection parts 31, 32 takes place. With the position change of the connection parts 31, 32 the static part 104 (i.e. the carrier) of the star design planetary gearbox system 14 can be decoupled and coupled.

FIGS. 2 and 3 show different locations for the kinematic switch device 1. It is understood that other locations are possible.

Figure 4A:
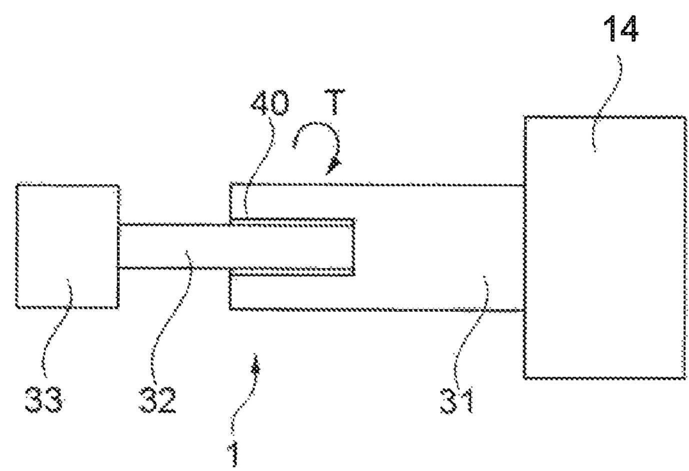
FIG. 4A shows a schematic representation of an embodiment of a mechanical switch device in a first engaged position.
Figure 4B:
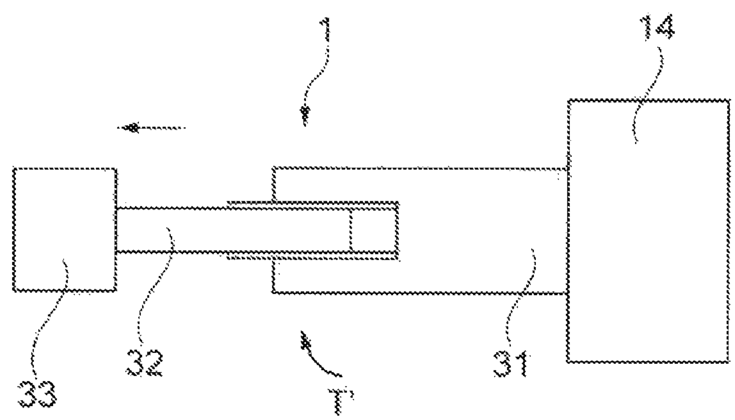
FIG. 4B shows a schematic representation of the embodiment in FIG. 4A in a second disengaged position.

In FIG. 4A, 4B the operation of an embodiment of a kinematic switch device 1 is shown. This can be used in various locations within the geared turbofan engine, in particular with the geared turbofan engine 10 as shown in FIG. 1.

The kinematic switch device two connecting parts 31, 32. Connecting means in this context that the parts can be connected but the can also become disengaged or reengaged. This can be considered as a switching step.

Typical positions within an aircraft engine of such connecting parts of a kinematic switch device 1 are shown in FIGS. 2 and 3.

A first engaged position is shown in FIG. 4A. Here, the first connecting part 31 is positioned fixedly relative to a ring gear mount 101 or a ring gear 109 of a gearbox system 14 of the geared turbofan engine 10. It should be noted that FIG. 4A shows this geometric relationship only in a very schematic way.

The second connecting part 32 is positioned fixedly relative to an engine part 33, which can be any static part within the geared turbofan engine 10. In FIGS. 2 and 3 the position of a fixed part 107 of an engine is shown.

Furthermore, the kinematic switch device 1 comprises means 40 for automatically triggering a position change (e.g. an disengagement, engagement, reengagement) by bringing at least one of the connecting parts 31, 32 relative to the other connecting parts 32, 31 into a disengagement position in dependence of the effective torque T on the connecting parts 31, 32.

The second position (i.e. the disengagement position) is shown in FIG. 4B.

That means that the first and second connecting parts 31, 32 have moved apart. This can be achieved e.g. by moving the first connecting part 31 relative to the second connecting part 32, by moving the second connecting part 32 relative to the first connecting part 31 or a mutual movement of both connecting parts 31, 32.

In FIG. 4B the connecting parts 31, 32 are moved apart for reasons of clarity. As will be shown in connection with FIG. 5A, 5B the kinematic switch device 1 can comprise further engine parts 41.

The movement of the connecting parts 31, 32 is here demonstrated with two parts 31, 32 assembled axially. As will be shown below, the connecting parts 31, 32 can have other geometric conformations and can perform other movements.

The means 40 for automatically triggering the position change (e.g. engagement, disengagement) comprise in the embodiment shown, a helical spline.

Helical splines have ridges or teeth that mesh with grooves in a mating piece and transfer torque to it. A helical spine comprises equally spaced grooves forming a helix about the shaft. The sides may be parallel or involute. This can either minimize stress concentrations for a stationary joint under high load, or allow for rotary and linear motion between the parts. Another feature of the helical spline is that it reacts differently to torque T in different directions. Furthermore, the helical spline generates an axial load which can open or close the kinematic switch; a helical spline can translate an angular movement into an axial movement. In embodiments shown the helical angle can be between 15 and 75°.

In FIG. 4A, the torque T is applied in the nominal direction and is transmitted through the rotating shafts 106 (see FIG. 1) on the connecting parts 31, 32. The connecting parts 31, 32 are connected in the first engaged position so they can absorb the torque T; the helical spline connection is pulling the connecting parts 31, 32 together.

If the direction of the torque T changes (e.g. into the non-nominal direction T'), the reverse process happens, i.e. the helical spline connection opens into the second position, disengaging two connecting parts 31, 32.

In other embodiments, the means 40 for automatically trigger the position change can comprise e.g. an explosive bolt device which is activated depending on the acting torque T, T'. In addition or alternatively, the means for automatically triggering the position change can comprise an automatic clutch.

It should be noted that the reversal of the torque direction T, T' does not have to be connected with a non-nominal event. The disengagement of the kinematic switch device 1 is effected rather in dependence of the torque effectively present at the connecting parts 31, 32.

Figure 5A:
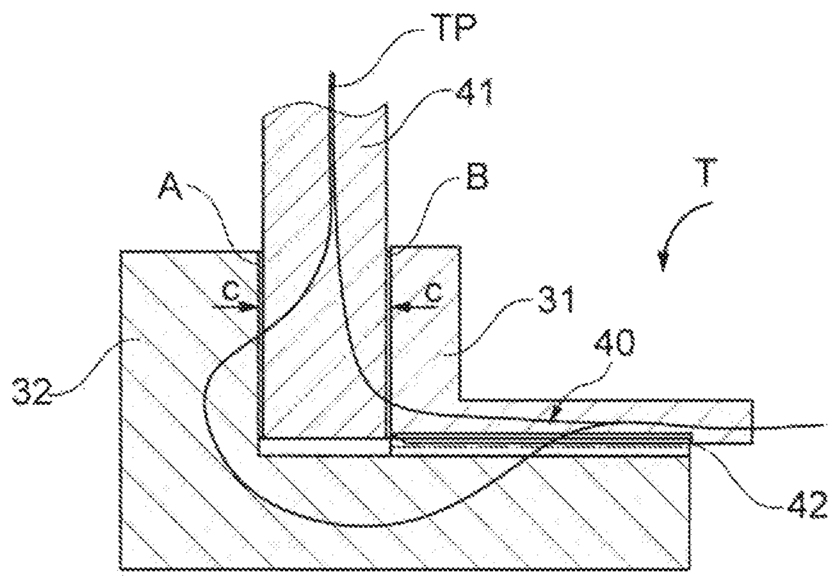
FIG. 5A shows a schematic representation of a further embodiment of the kinematic switch device in a first engaged position.
Figure 5B:
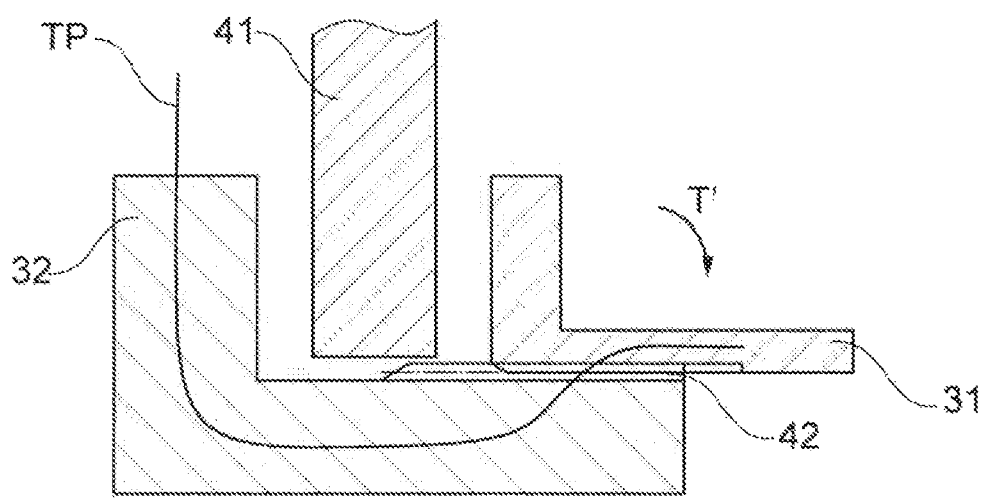
FIG. 5B shows a schematic representation of the embodiment shown in FIG. 5A in a second disengaged position.

In FIG. 5A, 5B a different embodiment is shown involving a kinematic switch device 1 coupled with a driven engine part 41 in the first position.

The connecting parts 31, 32 interact in the first position (i.e. an engaged position) with the engine part 41 by clamping it (see FIG. 5A) in the first position. This can also be termed as a three plate flange.

The connecting parts 31, 32 become rotatable as they are moved apart (see FIG. 3B) into the second position (i.e. a disengaged position). In the embodiment shown the engine part 41 is a part of a front panel.

In FIG. 5A the first connection part 31 is coupled to a ring gear mount 101 of the gearbox system 14 (not shown in FIG. 5A). The second connection part 32 is connected to a sleeve. The two connection parts 31, 32 are connected through a helical spline 42. The concept of the helical spline is described in connection with FIG. 4A, 4B so that reference can be made to that description.

In the engaged first position shown in FIG. 5A, the torque path TP is shown. Essentially, the engine part 41 (i.e. sleeve) is clamped between the two connection parts 31, 32.

The connection parts 31, 32 have both ring like sections (i.e. pointing into the radial direction) with parallel interfaces A, B with the engine part 41. The engine part 41 is positioned and clamped between the connection parts 31, 32 by friction-locking. The clamping forces C acting on the interfaces A, B are shown in FIG. 3A.

In other alternatives, the connection parts 31, 32 can be form-locked with the engine part 41. Also, a mixture of form-locking and friction-locking can be used to clamp the engine part 41 in the engaged position.

In FIG. 5B the kinematic switch device 1 is shown in the second position, i.e. a disengaged position. A reversal from of the torque effective on the connection parts 31, 32 has caused the helical spline connection 42 to move apart, but not completely. Therefore, the friction-locking and/or form-locking of the engine part 41 is disengaged. The disengagement now allows a free rotation of the propulsive fan 13 (see e.g. FIG. 2 or 3).

As shown in FIG. 5B the torque path TP no longer passes through the engine part 41, so that the connecting parts 31, 32 can move freely.

In one embodiment, at the interface A, B of the engine part 41 a coating with a high friction (0.3 to 0.9) coefficient (larger than 0.5) is used to facilitate clamping in the engaged position (FIG. 4A, 5A).

Figure 6A:
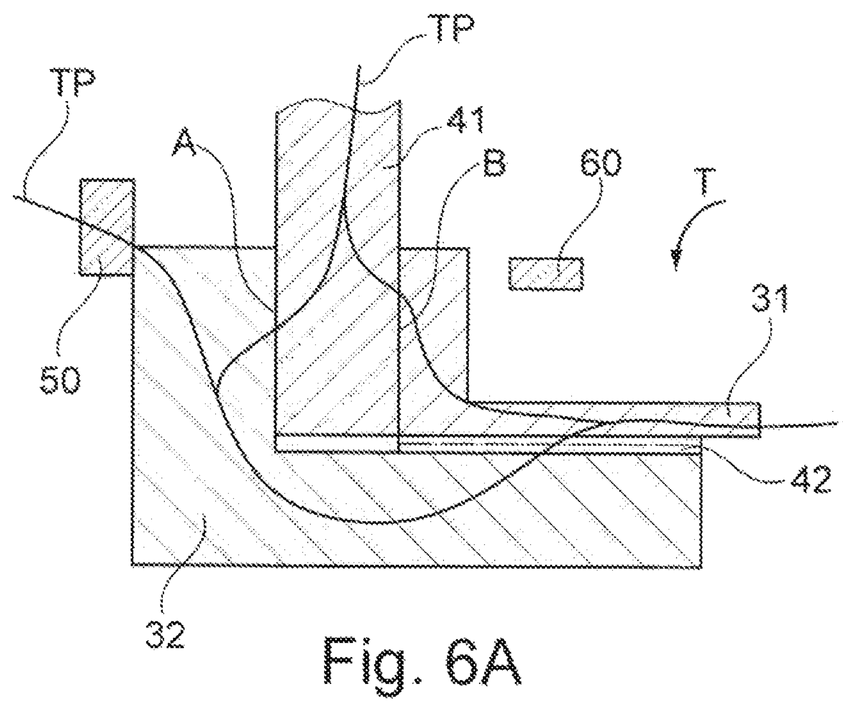
FIG. 6A shows a schematic representation of a further embodiment of the kinematic switch device in a first engaged position.
Figure 6B:
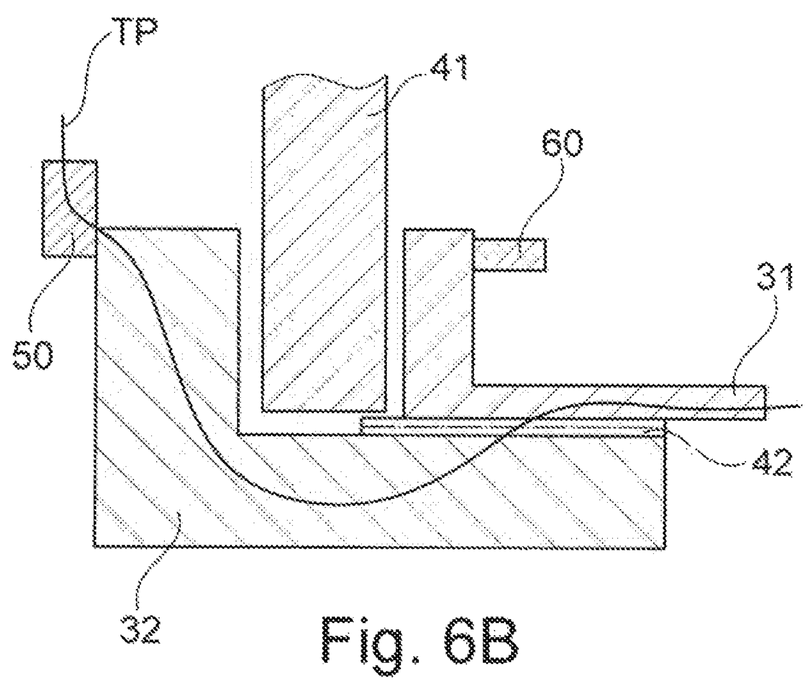
FIG. 6B shows a schematic representation of the embodiment shown in FIG. 6A in a second disengaged position.

In FIG. 6A, 6B a variation of the embodiment in FIG. 5A, 5B is shown so that reference can be made to the respective description.

As in the embodiment shown in FIG. 5A, 5B the first and second connection parts 31, 32 clamp an engine part 41 in a first position. This is the engagement position.

In addition to these parts, a clamping preloading device 50 is in contact with the second connecting part 32. There is a preloading force acting from the preloading device 50 onto the second connecting part 32. Hence, the second connecting part 32 is pressed against the engine part 41 with a pre-clamping. This achieves some friction even if there is no torque and it put the parts in a fixed position under normal operation. This preload has to be overcome by the force generated by the helical spline before the kinematic switch device 1 (e.g. a clutch) is opening. Further, it guarantees the ability of closure of the clutch with the second connecting part 32 in contact guaranteeing the torque path TP through the helical spline.

This arrangement also results in a different torque path TP. The torque path extends into the torque preloading device 50.

In one embodiment, the torque preloading device 50 comprises a plate for an abutment of the second static part 42. Alternatively or in addition, a spring device or an elastic device can provide some additional preloading force to the second static part 42.

In FIG. 6A also an axial retention device 60 is shown, which limits the axial movements of the first connection part 31. In the first position (shown in FIG. 6A) there is no contact between axial retention device 60 and the first connection part 31.

Embodiments as shown in FIG. 5A, 58 only having an additional axial retention device 60 or a torque preloading device 50 are possible.

In FIG. 6B the embodiment of the kinematic switch device 1 is shown in a second position in which the engine part 41 is disengaged from the connection part 31, 32. The first connection part 31 now abuts the axial retention device 60. The disengagement now allows a free rotation of the propulsive fan 13.

Figure 7:
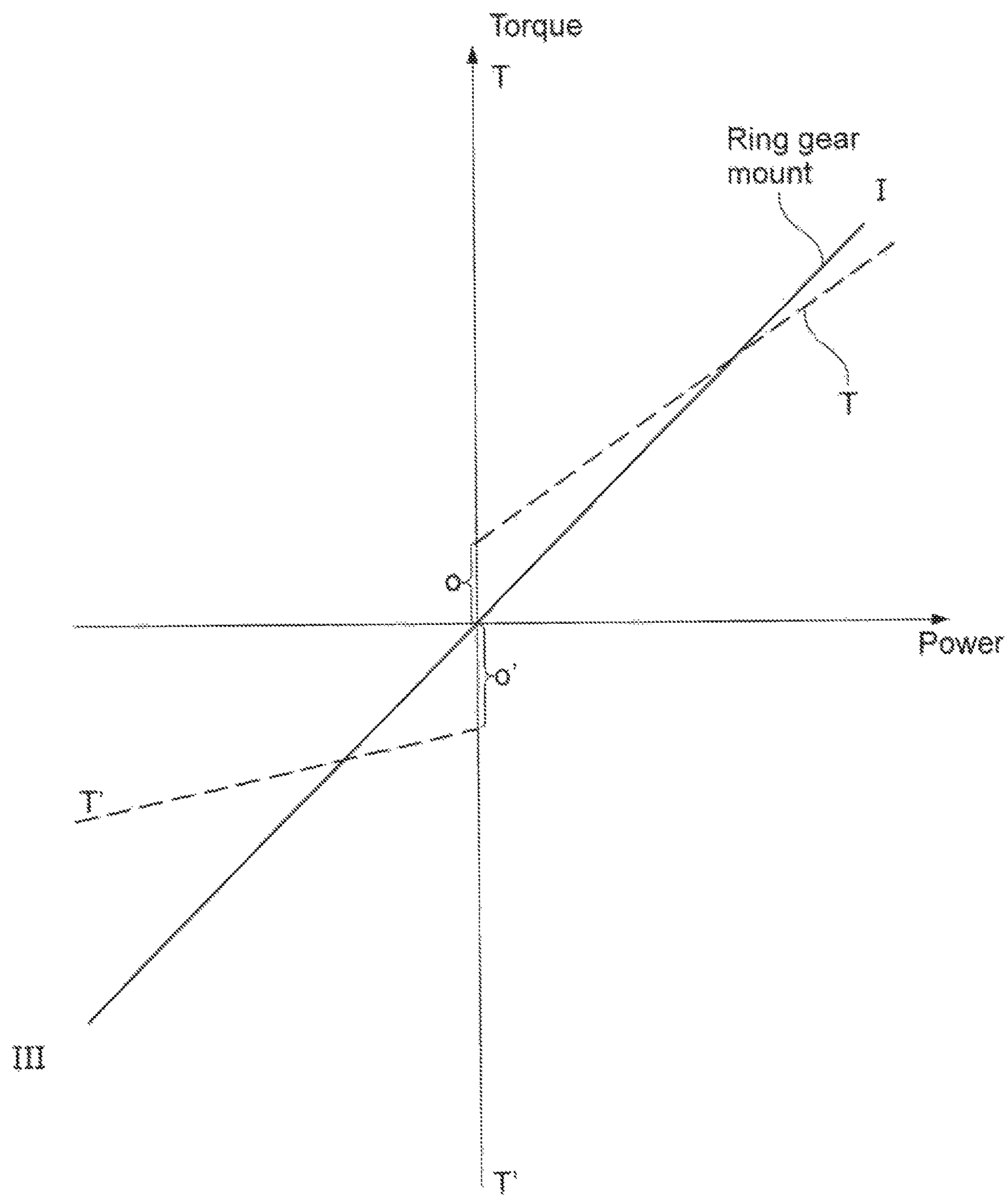
FIG. 7 shows a diagram of the torque and power transmission in an embodiment of the kinematic switch device.

The effect of the torque preloading 50 can be seen schematically in FIG. 7 illustrating the transmittable torque T, T' through a kinematic switch device 1.

The power which is generated or consumed by a geared turbofan engine 10 with a propulsive fan 13 is plotted on the x-axis. Positive power values represent nominal operation, i.e. the turbine is driving the system. Negative power values represent a non-nominal case in which the system is driven by the propulsive fan 13 (e.g. windmilling in case of a gearbox failure, no driving through turbine).

The transmittable torque T, T' is plotted on the y-axis.

In the first quadrant I the geared turbofan engine 10 is turbine driven and the torque T is positive, i.e. the operation is nominal.

Due to a pre-loading of the kinematic switch device 1, there is a positive intercept of the transmittable torque T line with the y-axis.

The slope of the dashed line indicating the transmittable torque T is smaller than the slope of the line representing the torque the ring gear mount. At the point where the transmittable torque T becomes smaller than the ring gear torque, the clutch in the mechanical switch device 1 begins to slip.

In the third quadrant III the sign of the transmittable torque T' is reversed and the kinematic switch device 1 moves from the first to the second position disengaging the engine part 41 in the process. The engine part 41 is connected with the propulsive fan 13 which now can turn freely in windmilling mode. Thereby, some torque can be transmitted, which can e.g. drive a generator of generating electrical power.

The torque preloading device 50 has the effect that at zero power generation, i.e. with the engine at rest, some preloaded torque is present. This can be seen by the positive offset O and negative offset O' along the y-axis. This implies that for the change in the position of the connecting parts 31, 32 the preloaded torque needs to be overcome before the clamped engine part 41 becomes disengaged.

At the point at which the absolute value of the transmittable torque T' becomes smaller than the ring gear mount torque, the clutch (i.e. here the kinematic switch device) disengages.

Figure 8A:
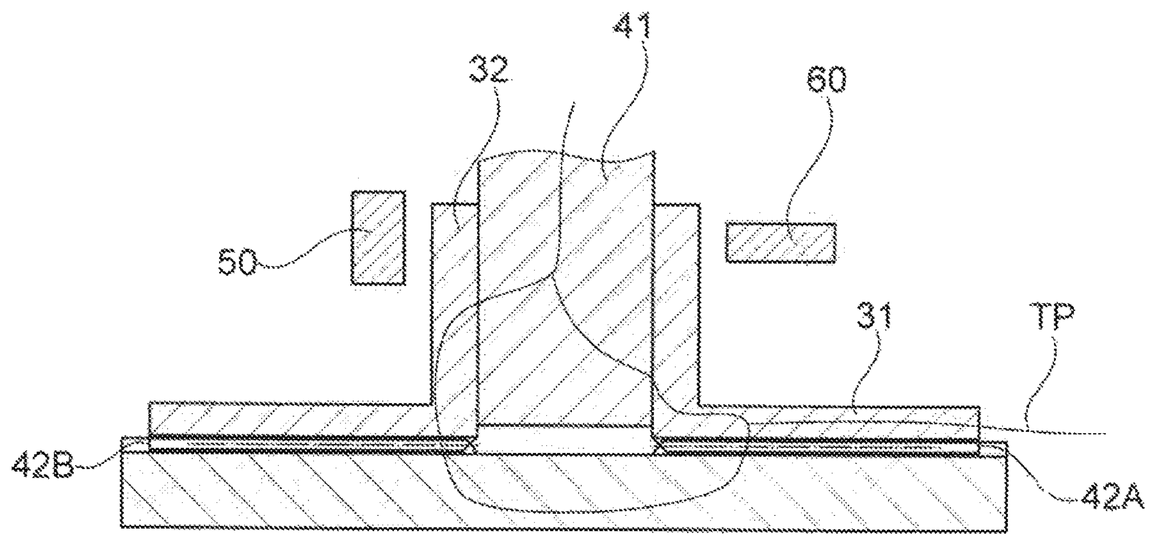
FIG. 8A shows a schematic drawing of an embodiment of a kinematic switch device with a means for balancing axial loads under nominal conditions.
Figure 8B:
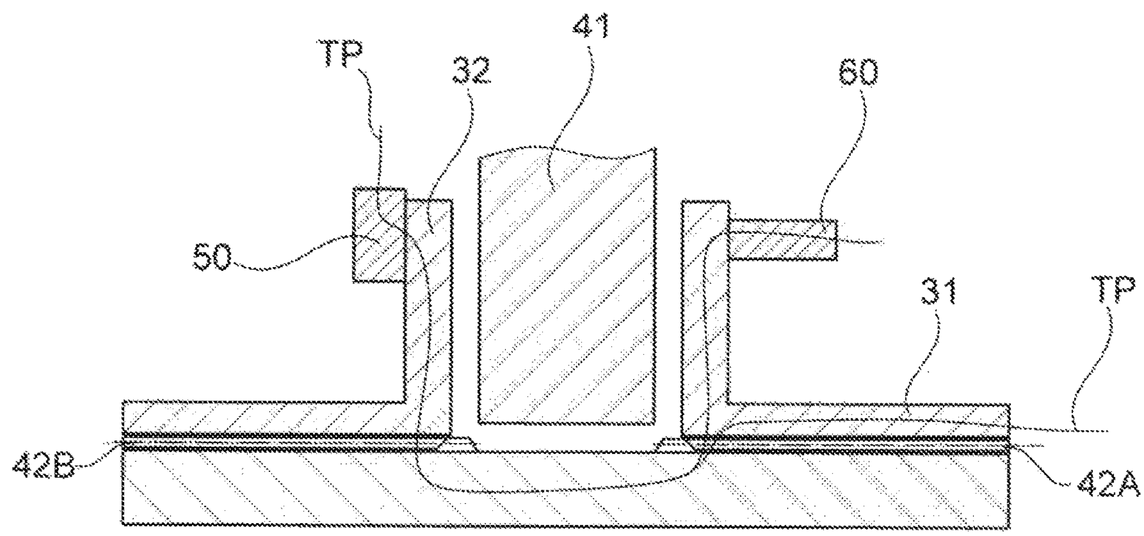
FIG. 8B shows the embodiment of FIG. 8 under torques with different rotation directions.

In FIGS. 8A and 8B an embodiment of a kinematic switch device 1 with two helical spline connections 42A, 42B is shown. The embodiment is a variation of the embodiments described in connection with FIG. 3A, 3B, 4A, 4B so that reference can be made to the respective description.

As in the embodiment of FIG. 4A, 4B the first and second connection parts 31, 32 clamp an engine part 41 in a first position. This is the engagement position shown in FIG. 8A. But here both connection parts 31, 32 comprise helical spline connections 42A, 42B. The rotational arrangement are such that under nominal conditions (FIG. 8A) the torque flow causes axial loads in opposite directions on the engine part 41 (e.g. a front panel).

If the torque direction for some reason is reversed, the helical spline connections 42A, 42B are moving apart, so that no clamping force is acting on the engine part 41 (FIG. 8B). The torque path TP now goes from the first connection part 31 to the second connecting 32 without going through the engine part 41.

The embodiments described herein can e.g. be used in connection with a management of the rotatory behavior of the propulsive fan 13. Under certain operating conditions, the propulsive fan 13 is not required to provide thrust (e.g. windmilling after a gearbox 14 seizure or another failure, descent phase of an airplane). The decoupling of the propulsive fan 13 using a mechanical clutch device 1 provides an operation regime in which the propulsive fan 13 can freely rotate. If e.g. the operation requires a reengagement, the mechanical clutch device 1 couples the propulsive fan 1 back to a torque T source, e.g. a turbine stage.

LIST OF REFERENCE NUMBERS

1 kinematic switch device
1A location for kinematic switch device
1B location for kinematic switch device
1C location for kinematic switch device
10 geared turbo engine
11 principal rotational axis
12 air intake
13 propulsive fan
14 planetary gearbox system, power gearbox
15 intermediate pressure compressor
16 high-pressure compressor
17 combustion equipment
18 high-pressure turbine
19 intermediate-pressure turbine
20 exhaust nozzle
21 fan casing
22 by-pass duct
31 first connecting part
32 second connecting part
33 engine part
40 means for automatically triggering the kinematic switch device
41 engine part, front panel
42 helical spline connection
42A first helical spline connection
42B second helical spline connection
50 clamping preloading device
60 axial retention device
101 ring gear mount
102 sun gear of power gearbox
103 planetary gear
104 carrier
106 driving shaft of sun gear
107 fixed part of engine
108 output shaft of gearbox
109 ring gear A first interface between parts
B second interface between parts
O offset of torque due to preloading (nominal direction)
O' offset of torque due to preloading (non-nominal direction)
T torque (nominal direction)
T' torque (non-nominal direction)
TP torque path

The invention claimed is:

1. A planetary gearbox system of a geared aircraft turbofan engine, comprising:
- a plurality of parts including:
  - a ring gear,
  - a sun gear,
  - a carrier,
  - planetary gears,
- at least one kinematic switch device,
- wherein a static part of the plurality of parts is in rest under nominal operation,
- wherein the at least one kinematic switch device is suitable for at least one chosen from:
  - decoupling the static part to become rotatable, and
  - coupling a rotatable part of the plurality of parts to become static,
- wherein the at least one kinematic switch device comprises two connecting parts and a position change mechanism to automatically trigger a position change in at least one of the two connecting parts relative to at least one chosen from the other of the two connecting parts and an engine part, from a first position into a second position in dependence of a non-nominal torque or a reversal in a direction of a torque effective on at least one chosen from one of the two connecting parts and the engine part, and
- wherein the position change mechanism comprises at least one chosen from a helical spline connection between the two connecting parts, an explosive bolt device, an automatic clutch device and a hydraulic device,
- wherein the two connecting parts are directly connected to at least one chosen from a shaft and the ring gear.

2. The planetary gearbox system according to claim 1, wherein the static part which is decouplable or the rotatable part which is couplable is the ring gear of an epicyclic planetary gearbox system or the carrier of a star-design planetary gearbox system.

3. The planetary gearbox system according to claim 1, wherein the at least one kinematic switch device includes at least one chosen from a mechanical fuse for decoupling the static part into a rotatable part and a clutch device for decoupling the static part or coupling the rotatable part.

4. The planetary gearbox system according to claim 1, wherein the decoupling of the static part is triggered by a predetermined kinematic condition.

5. The planetary gearbox system according to claim 4, wherein the predetermined kinematic condition comprises 1) a torque acting on one of the plurality of parts exceeding a threshold value or 2) a direction of torque acting on one of the plurality of parts changing direction.

6. The planetary gearbox system according to claim 1, wherein the decoupling of the static part or coupling of the rotatable part is effected by the kinematic switch device operating an actuator.

7. The planetary gearbox system according to claim 1, wherein the decoupled part generates additional power under rotation.

8. The planetary gearbox system according to claim 1, and further comprising at least one chosen from:
- wherein torque transmission characteristics of the helical spline connection are asymmetric relative to a torque applied to the helical spline connection, and
- the automatic clutch device comprises a device for balancing axial loads.

9. The planetary gearbox system according to claim 1, wherein:
- in the first position, the two connecting parts are mechanically engaged with at least one chosen from each other and with the engine part, so that torque is transmittable between the two connecting parts, and
- in the second position, the two connecting parts are mechanically disengaged from at least one chosen from each other and the engine part, enabling a free relative movement between the two connecting parts and the engine part.

10. The planetary gearbox system according to claim 1, and further comprising at least one chosen from:
- wherein at least one chosen from a first one and a second one of the two connecting parts is coupled to a ring gear mount of the gearbox,
- wherein at least one chosen from the first one and the second one of the two connecting parts is rigidly connected to the ring gear mount of the gearbox,
- wherein at least one chosen from the first one and the second one of the two connecting parts is one piece with the ring gear mount of the gearbox, and
- wherein at least one chosen from the first one and the second one of the two connecting parts is coupled with a static structure of the aircraft turbofan engine.

11. The planetary gearbox system according to claim 1, wherein at least one chosen from a first one and a second one of the two connecting parts is coupled to the static part.

12. The planetary gearbox system according to claim 1, wherein the engine part is positioned in the first position fixedly relative to the two connecting parts and in the second position, at least one of the two connecting parts is movable relative to the engine part.

13. The planetary gearbox system according to claim 12, comprising the automatic clutch device, wherein a first one and a second one of the two connecting parts each comprises a contact interface with the engine part, the contact interfaces being parallel to each other or angled to each other.

14. The planetary gearbox system according to claim 1, wherein the engine part comprises a ring structure which is positioned in the first position between the two connecting parts, the two connecting parts also comprising ring structures.

15. The planetary gearbox system according to claim 1, and further comprising a clamping preloading device to apply a predetermined force to the kinematic switch device.

16. The planetary gearbox system according to claim 15, and further comprising an axial retention device.

17. The planetary gearbox system according to claim 1, wherein a connection between at least one of the two connecting parts and the engine part comprises a high friction coating on at least one surface of an interface of the at least one of the two connecting parts and the engine part.

18. The planetary gearbox system according to claim 16, wherein at least one chosen from a connection between the clamping preloading device and the engine part and a connection between the axial retention device and the at least one of the two connecting parts comprises a low friction coating on at least one surface.

19. The planetary gearbox system according to claim 1, wherein the planetary gearbox system is coupled to a propulsive fan of the geared aircraft turbofan engine, the propulsive fan being suitable for at least one chosen from:

driving an electrical generator in windmilling operation conditions, and being driven by external power source when decoupled through the automatic clutch device from a primary power source.

20. A method for operating a planetary gearbox system with a ring gear, a sun gear, a carrier and planetary gears as a plurality of parts in a geared aircraft turbofan engine, wherein a static part of the plurality of parts is in rest under nominal operation and the static part is decoupled with a kinematic switch device to become rotatable or a rotatable part is coupled with a kinematic switch device to become static, wherein the kinematic switch device comprises two connecting parts and a position change mechanism to automatically trigger a position change in at least one of the two connecting parts relative to at least one chosen from the other of the two connecting parts and an engine part, from a first position into a second position in dependence of a non-nominal torque or a reversal in a direction of a torque effective on at least one chosen from one of the two connecting parts and the engine part, and wherein the position change mechanism comprises at least one chosen from a helical spline connection between the two connecting parts, an explosive bolt device, an automatic clutch device and a hydraulic device, wherein the two connecting parts are directly connected to at least one chosen from a shaft and the ring gear.

* * * * *